Patented Nov. 24, 1925.

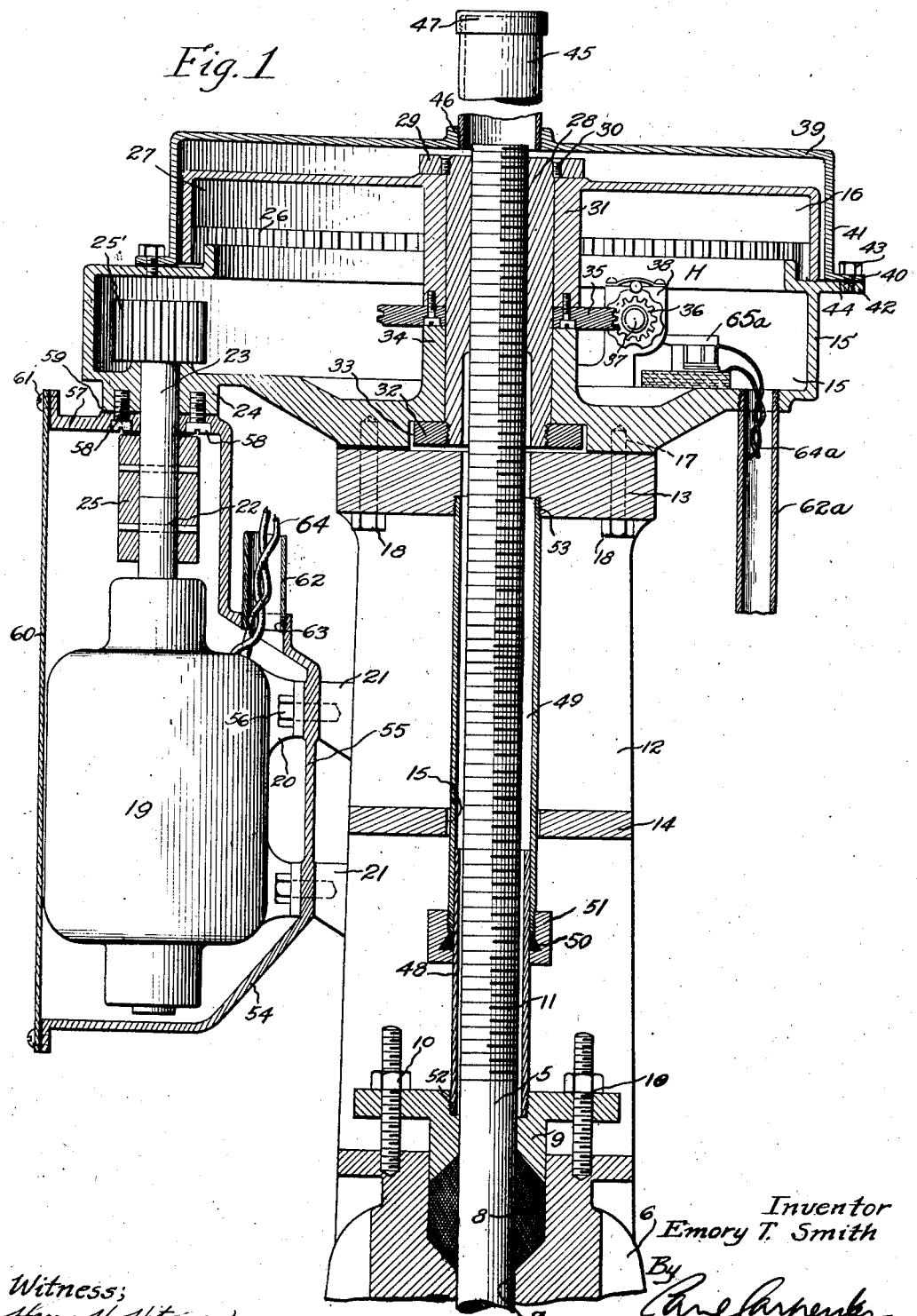

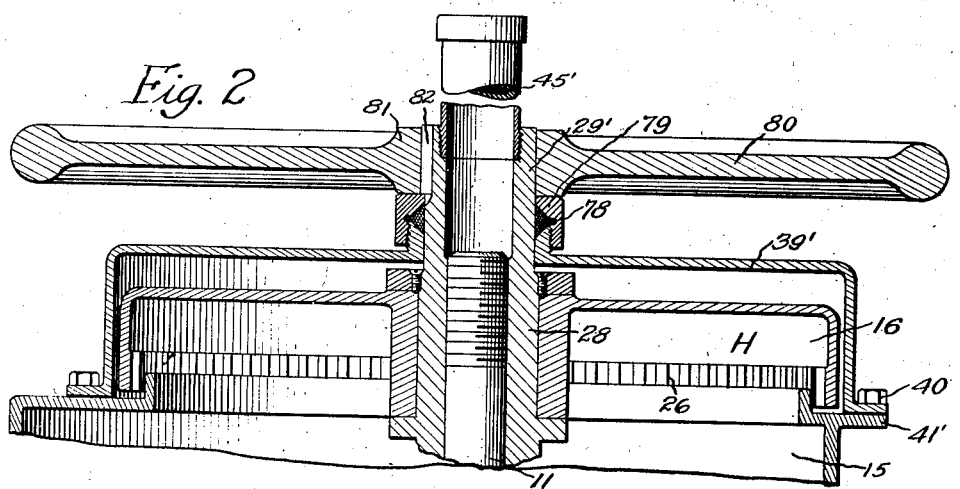
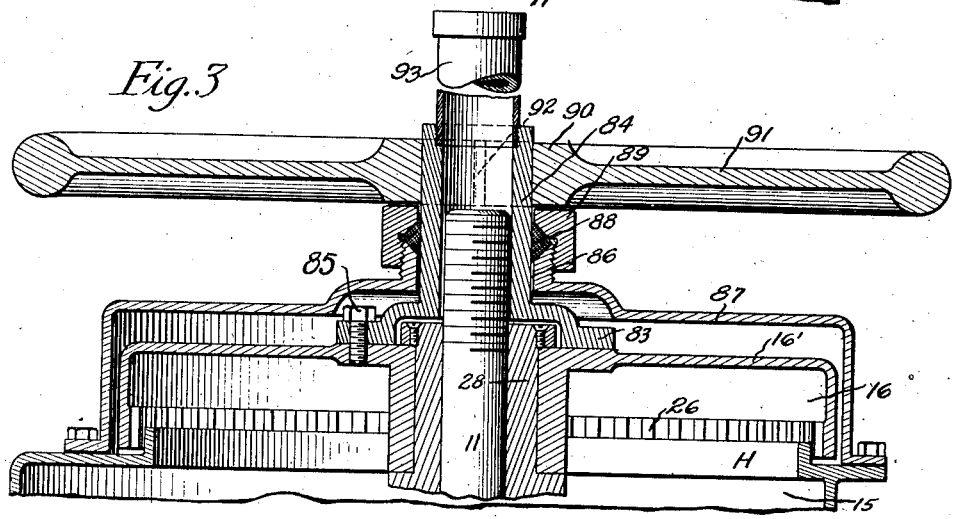
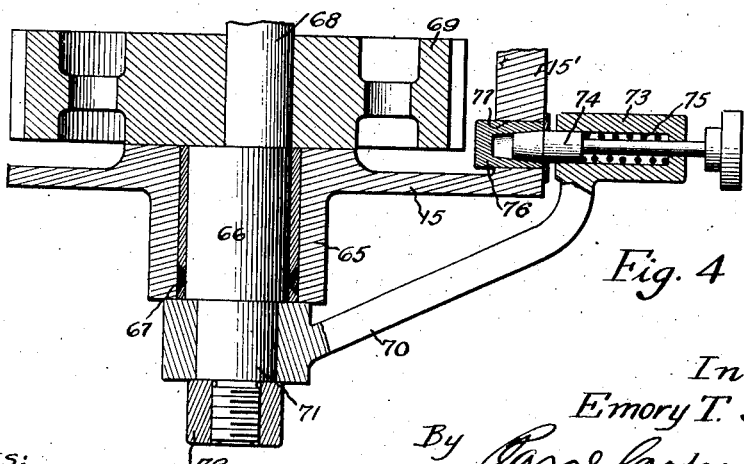

1,562,597

UNITED STATES PATENT OFFICE.

EMORY T. SMITH, OF LUDLOW, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS.

VALVE-OPERATING MECHANISM.

Application filed August 10, 1922. Serial No. 580,920.

*To all whom it may concern:*

Be it known that I, EMORY T. SMITH, a citizen of the United States, and a resident of the town of Ludlow, in the county of Hampden and State of Massachusetts, have invented certain new and useful Improvements in Valve-Operating Mechanism, of which the following is a specification.

This invention relates broadly to the transmission of power, more especially as adapted to the operation of valves and similar mechanisms, and more particularly pertains to improvements in protective casings for such apparatus, both from the standpoint of the combination of such casings with power transmission apparatus for operating valves or for other purposes, and from the standpoint of the casing per se.

While this invention is particularly adapted for use in connection with valve operating mechanism and to other mechanisms involving unit structures, and, as a matter of convenience in illustration, is shown as embodied in a structure for operating a valve, it will be understood that this invention has a wide field of utility for other purposes.

In my co-pending application, Serial No. 541,620, I have disclosed and claimed a valve operating device, and as this valve operating device has a wide field of utility, and is employed in various installations such as in mines, aboard ships and elsewhere, which subjects the valve and its operating mechanism to the effects of entrance of dust, moisture and other foreign matter, I have designed the present invention with a view to rendering the valve and operating mechanism dust and moisture proof, as well as to generally improve the structure of such devices. Of course, the details of construction herein illustrated and described may be varied within the spirit of the invention for adaptation to various valve operating and other mechanisms, and are not limited by any of the provisions of the co-pending application referred to.

The principal objects and advantages which characterize this invention reside in: the provision of improved means for protecting various motion imparting mechanisms against damage or undue wear; the provision of improved means for excluding foreign matter from various motion imparting mechanisms; the provision of an improved arrangement of protecting casings for excluding foreign matter, such as dust and moisture from all the moving parts of a mechanical organization; the provision, in combination with an element to be moved, power transmission mechanism, and a motor, of means for excluding foreign matter, such as dust and moisture from the moving parts of the device, whereby to improve the operation and efficiency of such devices, and increasing the usefulness and life of same.

Among other important objects and features of this invention are: the embodiment in a unit structure of means for operating various types, arrangements and sizes of valves and other mechanisms, and the provision of protective means therefor; the embodiment in a structure of means whereby the valve, or the like, may be operated manually or by other power in combination with protective means therefor; the arrangement of the manual and power actuated driving means wherein a motor, limit control means therefor, and manual means, and means for excluding dust, moisture, and the like, are all embodied in a structure which is compact, possesses strength and rigidity, and as a complete power transmission unit may be associated with any one of various elements to be moved, and various types of valves, whether rotary or reciprocable, without material modification of the valve or other structure; the complete housing of the power transmission mechanism to protect the same against damage due to entrance of foreign matter and to protect the operator against injury; the facility with which the various parts of the device may be reached for repair or replacement; the embodiment in a device of this character of an arrangement whereby assembly and dissembly of the parts may be quickly and facilely accomplished; and the novel means for operatively connecting the motor and transmission mechanism or for disconnecting the same, whereby the valve or other device may be manually operated when necessary or desirable independently of the motor and its associated driving elements, all characterized by the provision of protective casings.

Additional objects and features of utility and improvement reside in the particular embodiment illustrated and are: the mounting of the motor, and protective casing therefor, externally of the other parts of the device, yet upon the support for the same, whereby the motor and its casing, while not destroying the unity of the structure, are rendered readily accessible for repair or removal in order to reduce to a minimum the period of retirement of the valve or other device from service when repairs are required; the generally dust-proof casing for the power transmission means and associated parts; the simplicity of the control for effecting connection and disconnection of the motor to the transmission means and the dust-proof casing therefor; and the provision of a protective casing or casings for valve operating and similar mechanisms, for preventing entrance of moisture, dust and other foreign matter, into such mechanisms, thus increasing the efficiency of operation and life of the mechanism.

The foregoing as well as such further objects and additional benefits and advantages as may heerinafter appear or be pointed out, I attain by means of a construction, one embodiment of which is illustrated in the accompanying drawings wherein:

Figure 1 is a vertical sectional view of valve operating mechanism embodying the improvements of this invention;

Figure 2 is a fragmentary vertical sectional view of a modified or alternative form of the invention;

Figure 3 is a still further alternative form of the invention;

Figure 4 is an enlarged vertical sectional view of a detail; and

Figure 5:
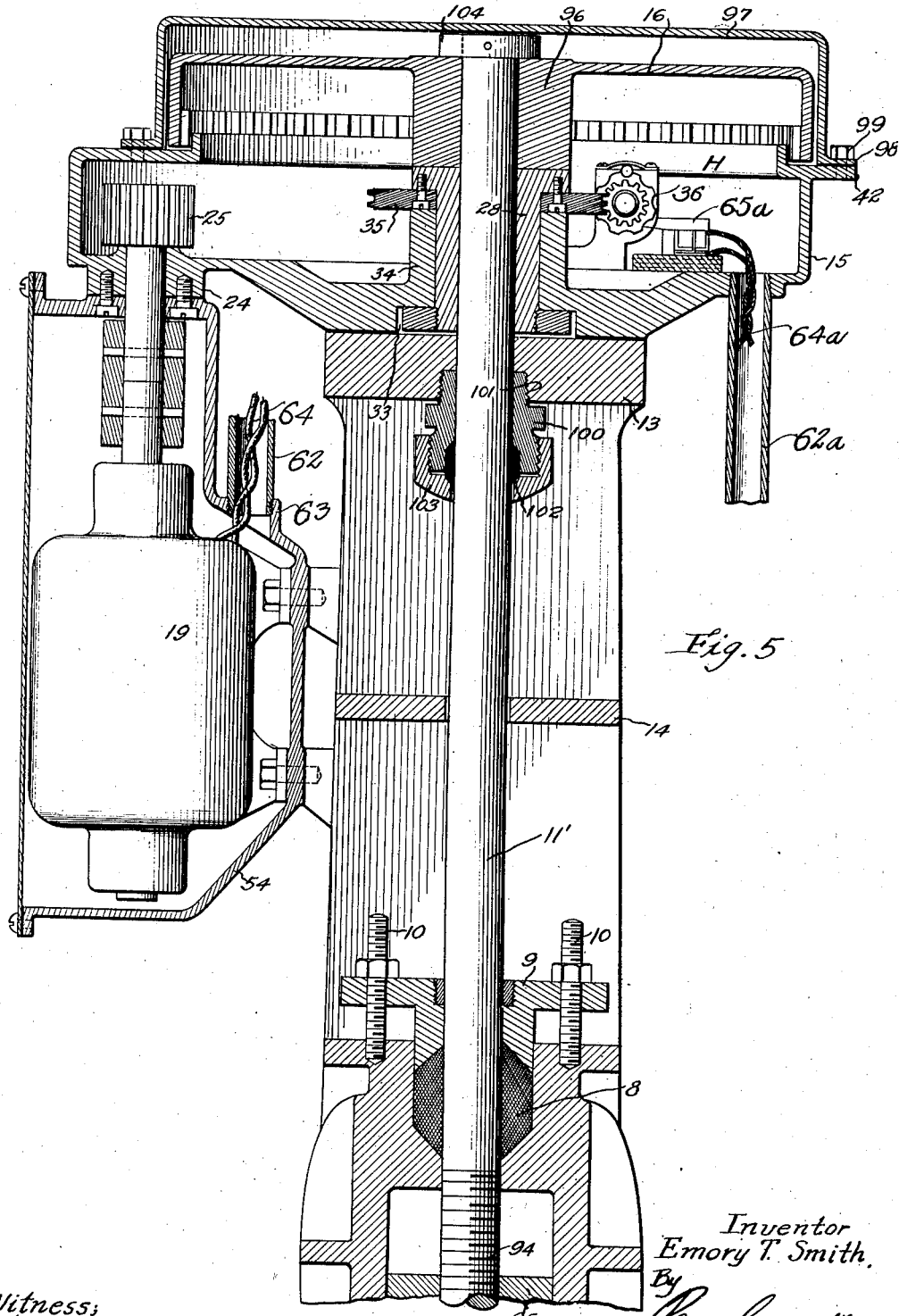
Figure 5 is a vertical sectional view of a still further alternative form of this invention.

The present invention involves the provision of a protective casing for the exposed parts of valve and other operating mechanisms, including the device described and claimed in the co-pending application hereinbefore referred to, and further involves a similar protective casing for a modification or alternative form of the valve operating mechanism, which alternative forms are described and illustrated in the present application. The protective casing, as applied to the subject matter of the co-pending application, is here described first.

Referring now in detail to the drawings, and first to Figure 1, wherein this invention is embodied in a structure particularly adapted for operating valves, a motion imparting element, which will be hereinafter termed the valve stem, is provided and designated 5. This element 5 is, when used in connection with a sliding gate valve, arranged for reciprocation, in this case vertical, in a casing 6, said casing containing what is commonly known as a gate valve (not shown) and the casing being provided with an opening 7, through which the valve stem 5 extends. A fluid tight packing 8 surrounds the valve stem 5 and is retained in position by a gland 9, bolts 10—10 serving to fixedly secure said gland. The valve stem, in the present arrangement, is provided with screw threads 11, which comprise one of the factors for accomplishing reciprocation of the valve stem.

The structure so far described may be found in various types of sliding gate valves, and in detail, forms no essential part of this invention, except in so far as the present invention is adapted thereto.

A standard 12, which is open, is suitably mounted on the casing 6, and in the arrangement shown, is provided with a supporting head 13 and a reinforcing web 14, the latter being provided with axial opening 15 for accommodating the valve stem 5 and other parts to be described.

Referring now generally to the power transmission mechanism and gearing and associated parts, there is provided, as shown generally in Figure 1, a housing H, composed of the lower portion 15, and the upper portion 16, which housing contains the aforementioned power transmission gearing and other associated mechanism. The lower portion 15 of the housing H is provided with a depending enlargement 17, which seats upon the head 13 and is fixedly secured thereto in any approved manner, such as by means of the bolts 18—18.

The power operating means of this invention preferably comprises an electric motor 19, the casing of which is provided with feet 20, arranged in pairs for securement to complementally arranged lugs 21 formed on the standard 12, and thereby supporting the motor on the standard 12 about midway of its length. The motor shaft 22 extends parallel to the valve stem 5, but to one side of the enlargement 17, said shaft 22 being connected to a shaft 23 mounted in a bearing 24, formed on the lower portion 15 of the housing H. The shafts 22 and 23 are in abutting relationship, and are connected by a sleeve 25, although any other approved means may be provided for connecting said shafts. The portion of the shaft 23 lying within the housing section 15 carries a pinion 25', which, through reduction gearing and a clutch mechanism (not shown), connects for imparting rotative motion to the upper portion 16 of the housing H. The section 16, on the peripheral wall 27 thereof, is provided with internal ring gear teeth 26, and said teeth are in meshing engagement, at times, with one of the component parts of the reduction gear mechanism previously referred to, but not shown.

As previously explained, the lower section 15 is fixedly secured to the standard 12, and the upper section 16 is rotatable upon said lower section, said upper section being connected operatively with the threaded part 11 of the valve stem, by the provision of an internally threaded sleeve 28, said sleeve secured against rectilinear movement by the provision of an annulus 29 and screws 30, which annulus abuts the hub 31 of the section 16, and a second annulus 32, secured to the lower end of said sleeve and disposed in a recess 33, formed in the base of the lower section 15. The sleeve 28 and the hub 31 are adapted to be operatively connected for simultaneous rotation by the provision of lost motion mechanism (not shown), and thus the sleeve and upper section 16, while capable of rotation, are effectively maintained against rectilinear displacement on the valve stem 11.

The bottom portion or section 15 of the housing H is provided with an upstanding axial hub 34, which extends to a point about midway of the sleeve 28, but in spaced relationship to the lower end of the hub 31. Between the adjacent ends of the hubs 31 and 34, there is provided a worm 35, said worm being fixedly secured to the hub 31 for rotation therewith. The worm 35 is engaged with a worm gear 36, mounted on a shaft 37, carried in bearings 38, provided on the lower section 15, and said shaft 37 serves to operate control switch mechanism for stopping the motor at each end of travel of the valve. The details of this control mechanism form no part of the present invention and have therefore been omitted. However, this structure is fully described, as are the reduction gearing and lost motion mechanism, in the hereinbefore referred to application.

In the structural arrangement illustrated in Figure 1 I have embodied therein means for rendering the housing H dust and moisture excluding, and similar means for the valve stem 5 and motor 19. For sealing the housing H, I provide an enveloping casing which comprises a cap section 39, provided with a peripheral flange 40, on the wall 41, said flange being secured to a complementally arranged flange 42, provided on the lower section 15. Bolts 43 serve to fixedly connect said flanges, and a suitable packing 44 may be disposed between the said flanges. As the valve stem 5, when reciprocated, must rise above the section 16 and the cap 39, the latter is provided with a pocket axially disposed thereon and comprising a vertical tube 45 in threaded engagement at 46 with a cap 39, said tube 45 being closed at its outer end by a cap 47.

The portion of the valve stem 5 which lies between the head 13 and the packing gland 9 is encompassed by an extensible casing comprising the tubular portions 48 and 49, said tubular portions being telescopically arranged and connected by a water proof coupling which comprises the packing 50 and the clamping ring 51, which latter is in threaded engagement with the tubular portion 49. The tubular portion 48 is threaded at 52 into the gland 9, and the tubular portion 49 is similarly threaded, at 53, into the head 13. It is required that the protecting casing comprising the sections 48 and 49 be extensible because the packing gland 9 must be moved at times in order to tighten the packing 8.

For excluding dust, moisture and the like from the motor, I provide an enveloping casing therefor designated 54, one wall 55 of said casing being secured by the foot pieces 20 and 21 and bolts 56, to the standard 12, and another wall 57 of said casing being secured by bolts 58 to the bearing 24, a suitable packing 59 being inserted between the wall 57 and said bearing. The front or outer wall 60 of the casing 54 is removably secured by screws 61, and a conduit 62 enters the casing 54 at the portion 63, said conduit extending to a main control panel and accommodating electrical conductors 64, through which current is supplied to the motor. On the main control panel, the motor circuit switches (not shown) are placed, said switches being operated by low voltage relays, which latter are energized by a light current flowing through conductors $64^a$ in the conduit $62^a$. The conductors 64 are energized between limits by the provision of push buttons arranged on a distant control board (not shown), and the limit switches $65^a$ open the low voltage circuit at the proper moment, thus deenergizing the relays and opening the motor circuit.

From the foregoing it will be seen that the device of this invention may be employed under almost any conditions of atmosphere, and that all dust, moisture and other foreign matter is effectively excluded from the moving part of the device. The cap 39 prevents, with the co-operation of the portions 48 and 49, any entrance of dust or moisture to either the housing H or to the valve stem and the housing 54 effectively excludes dust from the motor and its bearings. However, all of the protective casings are arranged in such a way that they do not interfere with the convenient operation of the device, nor do they interfere with convenient access to the parts of the device.

In Figure 4 there is illustrated a portion of the reduction gearing and clutch mechanism hereinbefore generally referred to. The casing 15 is provided with a bearing 65 in which a short shaft 66 is revoluble. A water-proof and dust-proof packing 67 is provided in the bearing 65 surrounding said shaft, and thus excludes dust and other foreign matter from entering the housing H at this point. On the shaft 66 a trunnion shaft 68 is mounted which carries a revoluble gear 69, said gear being adapted to engage with the pinion 25, and when properly moved, adapted to engage with the ring gear 26. For imparting motion to the shaft 66, and thus shifting the shaft 68, there is provided an arm 70, secured to an extension 71 of the shaft 66 by a nut 72, said arm extending upwardly and radially and being provided with a radial socket 73, in which a plunger 74 is reciprocable against the tension of a helical spring 75. The end of the plunger is adapted to engage in one of a series of recesses in the vertical wall 15', and to the end that foreign matter will be excluded at this point, there are provided thimbles 76 which are let into the opening 77.

In some instances it is desired to operate the valve either entirely manually, or alternately by power and manual means and to this end the apparatus as shown in Figure 1 is modified as shown in Figures 2 and 3.

Referring first to Figure 2, I have shown the sleeve 28 as provided with an axial extension 29', into the outer end of which is threaded the tube 45'. The cap or hood 39' is secured by bolt 40' to the flange 41' on the lower section 15, and said hood is provided with a packing 78 which surrounds the extension 29', and is secured by a clamping element 79, which likewise surrounds said extension 29'. A hand wheel 80 is here provided, having a hub 81, which is fixedly keyed at 82 to the extension 29', and this reciprocating motion may be imparted manually to the valve stem 11 by means of said hand wheel 80. The packing 78 prevents entrance of dust or moisture in this arrangement. As the sleeve 28 and hand wheel are direct-connected in Figure 2 the lost motion arrangement is not effective for manual operation, and this device is more particularly intended for installation in small sized units where the advantage to be gained by employing the lost motion connection is not essential.

Where it is desired to employ manual operating means in connection with the power operating means, and where it is desired to take advantage of the lost motion feature, a further alternative form of the device is provided and disclosed in Figure 3. In this arrangement the parts of the power transmission mechanism, housing H, valve stem 11, and sleeve 28 are the same as that shown in Figure 1. In order to manually drive the upper section of the housing, a pedestal nut, having a base 83 and a tubular shank 84, is axially secured by means of bolts 85 to the top wall 16' of the upper section 16, said shank 84 extending through a suitable opening 86 in the dust excluding cap 87, said cap having an axial packing element 88, secured by nut 89 and engaging said shank 84, for excluding dust and moisture at this point. The shank 84 extends beyond the nut 89 and receives the hub 90 of a hand wheel 91, said hub being keyed at 92 to the shank 84. In order to accommodate the valve stem 11, a tubular extension 93 is threaded into the upper end of the hollow shank 84 similarly to the engagement of the tube 45' with the extension 29'. The hood or cap 87 is secured to the lower section 15 similar to the securement of the caps 39 and 39' as hereinbefore described. In this arrangement it will be observed that instead of directly manually moving the sleeve 28, manual power is applied to the shank 84, which in turn imparts movement to the upper section 16 of the housing H, thus taking advantage of the provision of the lost motion mechanism. It will be observed that the devices of Figures 2 and 3 are interchangeable.

Upon reference to Figure 5, it will be observed that there is provided a valve casing, standard, housing, operating mechanism and a motor which are substantially identical with the invention disclosed in Figure 1, with the exception that, in Figure 5, the valve stem 11' is of the non-rising type, that is, the valve stem rotates and is in threaded engagement as at 94 with the element 95 to be moved, which may be a sliding gate valve.

In this arrangement, the valve stem 11' extends into the casing H, and is fixedly secured to the sleeve 28, a hub 96 being formed on the upper section 16 of said housing, in which the stem 11' is freely rotatable. A dust proof cap or hood 97 completely encompasses the upper section 16 and is provided with an annular flange 98, which seats on the flange 42 hereinbefore referred to. Nuts 99 connect said flanges 42 and 98. At the point where the valve stem 11' passes through the head 13, I provide a bushing 100, which is in threaded engagement at 101 with the head 13, and through which said valve stem passes; a packing 102 surrounds the valve stem 11', and a clamping nut 103 threads on to the outer end of the bushing 100 and retains said packing snugly against the valve stem 11'. In this arrangement the lost motion takes place between the hub 96 and the sleeve 28, which latter is slightly modified, in other words, shortened, as will be seen upon comparison to the disclosure of Figure 1. The upper section of the housing E is prevented against rising by the collar 104, carried by the upper projecting end of the valve stem 11'. The remaining elements disclosed in Figure 5, and not specifically referred to, are but a duplication of the same element illustrated in Figure 1. In this arrangement the motor, and other moving parts of the device are effectively protected against dust, moisture, and the like. The fact that a portion of the valve stem 11' is exposed does not affect the operativeness of the device because this part of the valve stem is not threaded for reciprocation, and it will be observed that the parts shown in Figures 1 and 5 are in a large degree interchangeable, that is, if desired, the protection casing comprising the tubular portions 48 and 49 may be readily substituted in place of the packing bushing 100. Similarly the operating parts, such as the different forms of sleeves and the different casing sections 16 may be interchanged as desired. Thus it is possible to convert the valve mechanism shown in Figure 1 to a type of valve mechanism similar to that shown in Figure 5, or vice versa.

Having thus described my invention and illustrated its use, what I claim as new and desire to secure by Letters Patent is:—

1. In a device of the character described, in combination, a housing comprising nested sections, one of which is movable as a driving member, an element to be driven by said movable section, and being in part disposed in said housing, a motor operatively connected to the housing for driving said movable section, and a dust and moisture excluding casing secured to one of the sections of the housing and entirely enclosing said driving section and its connection with the element to be driven by said housing.

2. In motion transmitting apparatus, a standard, a casing mounted upon said standard and containing an element to be driven, said casing having a movable part operatively connected to said element, an external motor mounted on said standard, power transmission mechanism completely housed in the casing and operatively connected to the motor shaft and the movable part of said casing, means for excluding dust and other foreign matter from said casing, motor and transmission mechanism, and auxiliary manual operating means disposed externally of the casing and connected to the movable part of said casing.

3. In a device of the character described, in combination, a housing having a movable element arranged therein, a portion of said element extending from the housing, a packing provided for said extending portion, an abutment spaced from the housing, and an extensible casing surrounding said extending portion and disposed between said packing and said abutment.

4. In a device of the character described, in combination, a housing having a movable element arranged therein, a portion of said element extending from the housing, a packing provided for said extending portion, an abutment spaced from the housing, and an extensible sectionalized casing surrounding said extending portion and disposed between and in part upon each of said packing and said abutment.

5. In a device of the character described, in combination, a two-part housing, an element to be moved being in part disposed in said housing, and a dust and moisture excluding casing secured to one of the parts of said housing and encompassing the other of the parts of said housing, said casing having a pocket for reception of said element to be moved.

6. A valve operating mechanism, comprising a standard secured to the valve casing, a gear mechanism casing supported upon the standard, a motor supported on the standard at one side of and for driving the mechanism in the casing, sealing means for said casing, and an encompassing casing for said motor supported by said gear mechanism casing.

7. A power driven operating unit for valves and the like including a standard having a housing, valve operating mechanism in said housing, a motor carried by said standard and having driving connection with said operating mechanism, and a dust proof casing entirely encompassing the motor and said driving connection, said dust proof casing being jointly supported by the housing and standard.

8. In a motion transmitting apparatus, in combination, a standard, an element to be driven arranged on said standard, a motor also mounted on said standard, power transmission mechanism connected to the element to be driven, a connection for the motor to said power transmission mechanism, a sealing casing for said motor and said connection, a sealing casing for said driven element, and a sealing casing for said power transmission mechanism adapted to receive a portion of said driven element.

9. In a device of the character described, in combination, a chamber having a movable element arranged therein, a housing associated with said chamber in spaced relation thereto and having operating mechanism therein, a stem extending from said movable element to said operating mechanism, and an adjustable protecting casing surrounding said stem between and connected to said housing and chamber.

10. In a device of the character described, in combination, a housing having relatively movable parts, an element to be moved by one of said parts, said element being in part disposed in said housing, and means cooperating with the stationary part of said housing for excluding foreign matter from the interior of said housing and from the exposed part of sad element to be moved.

11. In combination, a housing comprising two relatively movable sections, an element to be moved in said housing and projecting beyond the same, means for sealing said housing secured to one and encompassing the other of said sections, and a sealing member for the projecting part of said element to be moved and secured to one of the parts of said housing.

12. In combination, a housing comprising two relatively movable sections, an element to be moved in said housing and projecting beyond the same, means for sealing said housing secured to one and encompassing the other of said sections, a sealing member for the projecting part of said element to be moved and secured to one of the parts of said housing, and a manually operable member fixedly secured to a part of said last mentioned sealing member.

In testimony whereof I have hereunto placed my signature.

EMORY T. SMITH.